Figure 1:
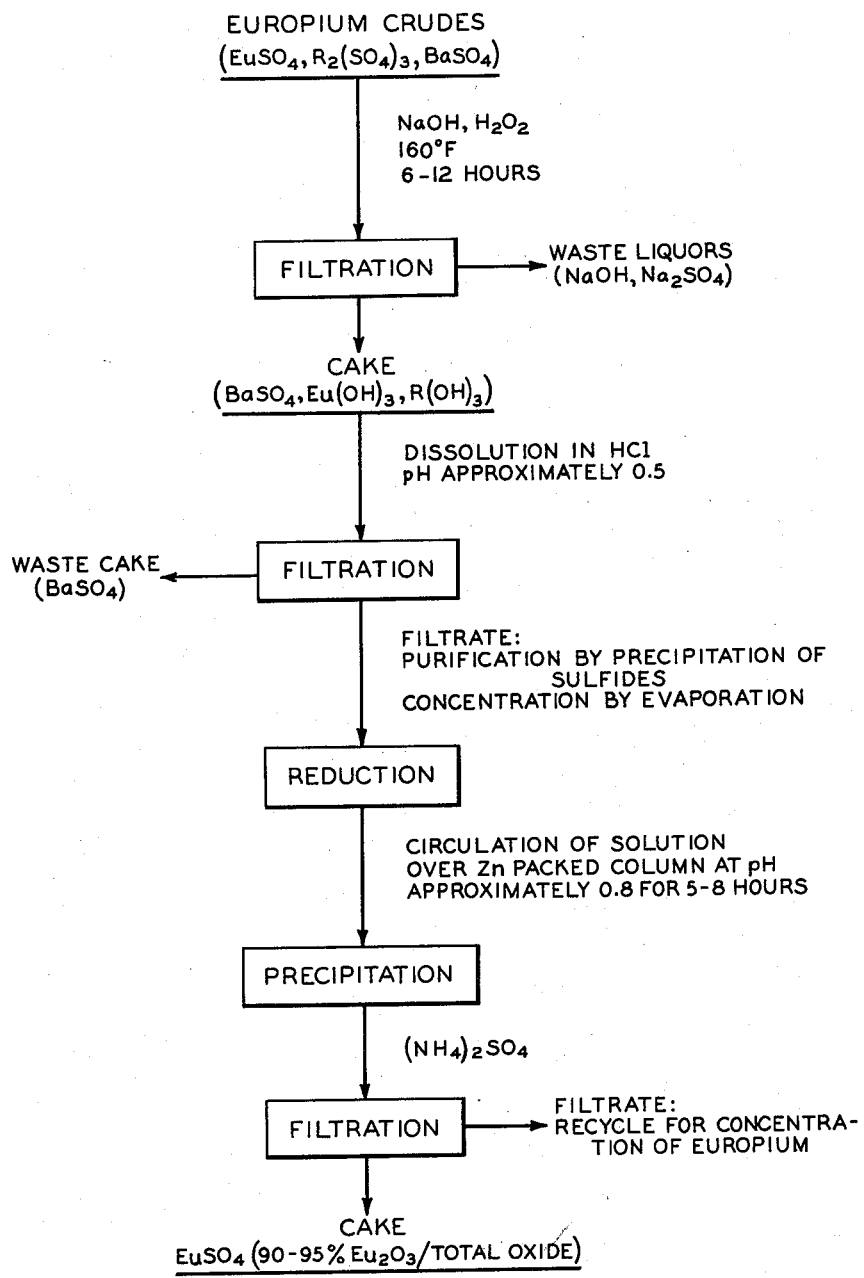

United States Patent Office 3,153,571
Patented Oct. 20, 1964

3,153,571
PURIFICATION OF EUROPIUM
Hugh J. Bronaugh, Chattanooga, Tenn., assignor, by mesne assignments, to Vitro Corporation of America, New York, N.Y., a corporation of Delaware
Filed Apr. 18, 1960, Ser. No. 22,834
5 Claims. (Cl. 23—22)

This invention relates to the purification of europium. The need for pure europium compounds is increasing as more uses are being found for it in the field of atomic energy. The unique neutron absorbing characteristics of europium permits its use as a control rod constituent in nuclear reactors.

In general, all of the prior art methods devised for the separation and purification of europium involve the reduction of the europic ion to the divalent state and subsequent purification of the insoluble compound produced as a result of said reduction. The disadvantage of these methods is that they require repetitive reductions to obtain a pure europium compound.

It is, therefore, an object of the present invention to present a convenient and efficient process for the purification of europium which requires only one reduction step.

Another object is to provide a process which yields europium oxides having a very high purity.

These and other objects of the present invention will become apparent as the description proceeds.

According to the process of the present invention, europium present in a mixture of soluble tervalent rare earth metals in an aqueous solution is treated to isolate and purify the europium. Initially, the europium is selectively reduced from the tervalent to the divalent state. This may be done by methods known in the art, such as treating with metallic zinc or sodium amalgam, or electrolytically, and one obtains thereby an aqueous solution of a mixture of soluble divalent europium ions and soluble tervalent ions of other rare earth metals. The latter solution is then treated with sulfate ion in a non-oxidizing medium, thereby to precipitate europous crystals selectively, but including some other rare earth metals as impurities. The bulk of the other rare earth metals, however, remains in solution as soluble tervalent salts.

The impure rare earth sulfate crystals are separated from the mother liquor and converted to europous carbonate under non-oxidizing conditions. It is preferred to do this by treating the europous sulfate with a strong alkaline solution of sodium carbonate but other alkali metal carbonates could be used. The europous carbonate readily dissolves in acid and so it is treated with an acid, still under non-oxidizing conditions, after which the tervalent rare earth impurities are selectively precipitated as the hydroxides by adding a suitable alkali. Any alkali which will raise the pH above 8 may be used but it is preferred to use ammonium hydroxide. Furthermore, it is preferred that the pH not rise above about 9.5 in this stage of the process. The alkalis, particularly ammonium hydroxide, retain the divalent europium in solution while precipitating the tervalent rare earth components. After the precipitated tervalent rare earth impurities have been removed from the mother liquor, which contains the desired europium, the purification procedure of the present invention is essentially complete. However, the purified solution of europium ions will ordinarily be concentrated and treated to recover the europium, eventually as europium oxide, $Eu_2O_3$.

The starting material for the present invention is any soluble rare earth compound containing europium in which the ratio of europium (expressed as the oxide) to total rare earth oxide may be as low as 11% without rendering the process inoperable. The concentration of the total oxide may be from about 50 to about 150 grams per liter. A starting material containing the desired minimum concentration of 11% europium oxide based on total rare earth oxide may be obtained by a variety of methods. One suitable method is to start with monazite, which contains up to about 0.1% $Eu_2O_3$ by weight based on the weight of other rare earth oxides. This is a phosphate and is "cracked" by treating with strong sodium hydroxide (50 to 60%) at 300° F. The phosphate is converted to rare earth hydroxides and soluble alkali phosphates. The insolubles are separated and washed.

Thorium is one valuable by-product present and this is separated by slowly adding acids such as hydrochloric acid until the pH is increased to about 4. The rare earth components dissolve and the thorium-containing component remains insoluble. The filtrate contains europium chlorides in the amount of about 0.12% europic oxide based on the weight of other rare earth oxides. The foregoing process for removing rare earth oxides from the ore, separating thorium and effecting a partial concentration of europic oxide is based on the published work of Charles de Rohden and Maurice Peltier.

The rare earth chlorides containing europium are then treated according to the process described in the copending United States patent application of Paul R. Kruesi and Hugh J. Bronaugh, filed concurrently herewith, entitled "Concentration of Rare Earths." The product of the latter process contains europium in the amount of about 0.4% europic oxide based on the weight of other rare earth oxides. The material referred to is described as "hot-hot" crystals of rare earth salts, which is dissolved in water and adjusted to a pH of 1.0 by adding hydrochloric acid. Reducible metallic ions which might be reduced simultaneously with europium are then removed by known procedures including the addition of sulfide ion to form the insoluble sulfides of the metals in question. Such easily reducible metallic impurities include lead, tin, iron and uranium. The precipitated sulfides are separated by filtration.

The acid solution is then ready to be treated with a reducing agent for the more easily reduced europium. Metallic zinc is a suitable reducing agent. Sulfate ion in the form of ammonium sulfate is then added to the solution, the latter being circulated and recycled continuously through a bed of metallic zinc. Barium ions, for example, as barium chloride, are added to the circulating solution and as the barium sulfate precipitates it carries with it most of the europous sulfate formed by the reducing action of the zinc. Strontium could be used instead of barium but it is more expensive.

After the reaction has been completed, the solids containing barium sulfate, europous sulfate, and some other rare earths are separated from the slurry and are treated with sodium hydroxide and an oxidizing agent, such as a peroxide, to form a mixture of rare earth hydroxides and barium sulfate, which is then centrifuged to produce a cake. The cake is then leached with hydrochloric acid to extract the rare earths as chlorides leaving the barium sulfate behind. At this point, the ratio of europic oxide to total other rare earth oxides is usually 30 to 40%. However, as previously stated, the amount may be as low as 11% without destroying the separation of europium oxide in the ensuing process. It is convenient, but not essential, that the starting material of the present process (i.e., the material containing a minimum of 11% europic oxides) be in the form of soluble chlorides. However, other soluble and non-oxidizing rare earth salts may be used. Accordingly, unless the material is already in the form of the chloride, it may first be treated with sodium hydroxide to convert the insoluble rare earth components to the acid soluble hydroxides which are easily dissolved in hydrochloric acid. Any insoluble barium sulfate remaining is thereby left behind. The foregoing process for preparing the starting material for the process of the present invention is suitable, but is not limiting in respect to the invention. Furthermore, other sources of rare earth metals may be used.

Following is a further explanation of some of the modifications and preferred conditions of the process of the invention.

The solution should be free of oxidizable anions and impurities, such as nitrate, iron, lead, uranium and dissolved air during the reduction and precipitation of europous sulfate. After purification to remove any reducible heavy metals remaining (lead, uranium, etc.), the solution is reduced preferably by circulating it through a column packed with zinc for about 4 to about 8 hours to reduce the europic ions to the divalent state. Europous sulfate is precipitated from the reduced solution preferably by adding a solution containing from about 100 to about 150 grams of ammonium sulfate per liter. The precipitate is filtered or centrifuged to produce a cake containing a europium oxide to rare earth oxide ratio of 90 to 95%. The precipitated concentrated europous sulfate is converted by appropriate chemical reactions, e.g., heating for about 10 to 30 minutes with sodium carbonate (1 normal) in the presence of sodium hydroxide (0.4 normal) at 95 to 100° C., to europous carbonate which is then dissolved in hydrochloric acid at room temperature, taking precautions to exclude air or any other oxidizing agents. For optimum yields, the resulting solution should have a total concentration (expressed as oxide) not greater than 50 grams per liter.

The solution at this point contains europous ions as well as a small quantity of other rare earth ions. An excess of ammonium hydroxide (e.g., 4 to 8 normal) is then preferably added to the solution at room temperature to precipitate the tervalent rare earths while retaining the divalent europium in solution. The slurry is filtered to produce a cake of rare earth hydroxides containing some europium which is then recycled to the reduction step. The filtrate is oxidized with air in the presence of excess ammonium hydroxide to yield europic hydroxide which may be calcined to an oxide of 99.8% to 99.9% purity.

Figure 2:
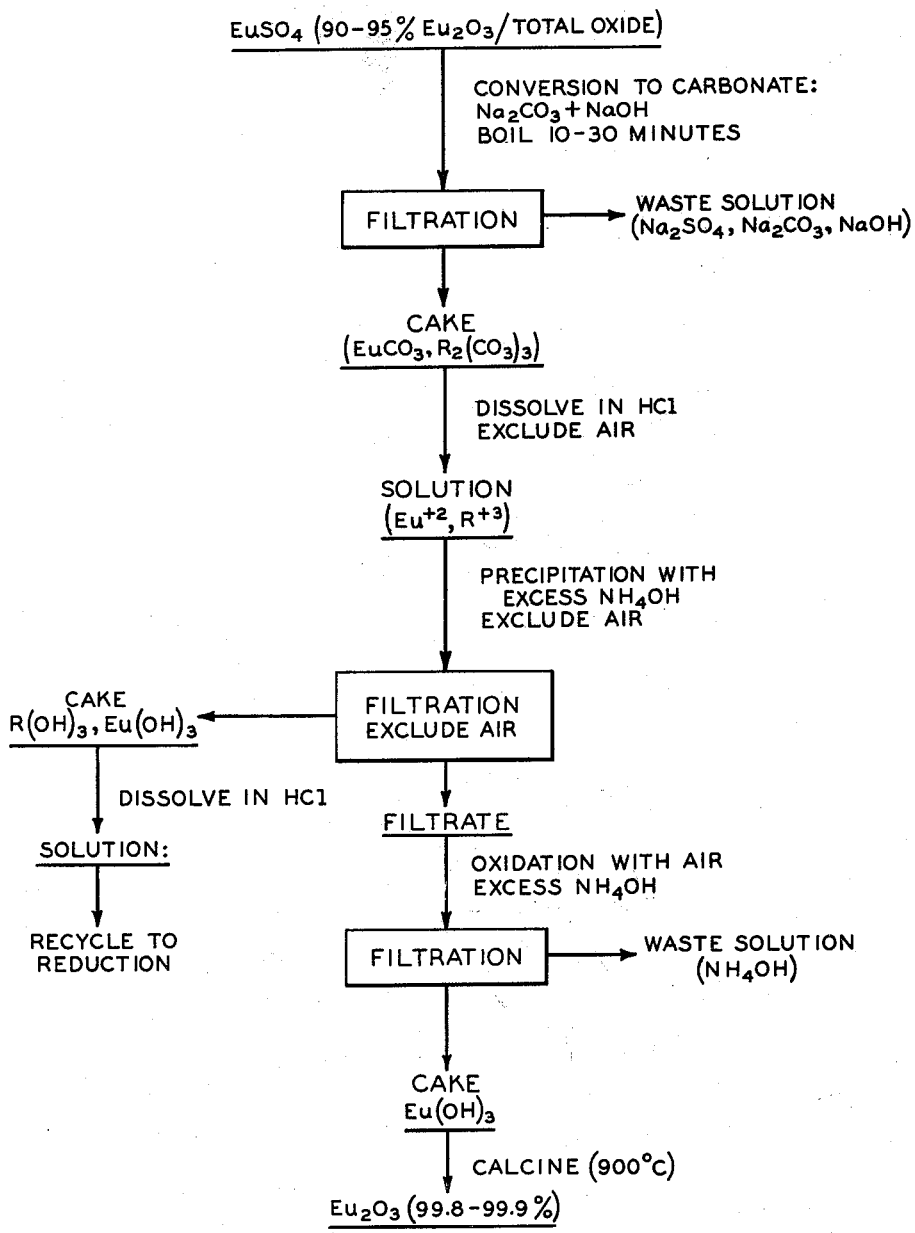

FIGURES 1 and 2 are flow sheets which illustrate the present process.

It is to be understood, of course, that the above procedures, as well as the following examples, merely illustrate the present invention and are not to be taken as limiting the invention.

EXAMPLE I

*Treatment of Feed*

425 lbs. of a crude europous sulfate, barium sulfate cake having a total oxide content ($R_2O_3$) of 7.05% and an europous oxide ($Eu_2O_3$) content of 2.24%, were formed into a slurry with water and treated with 100 lbs. of sodium hydroxide. Two (2) liters of 30% hydrogen peroxide were added and the temperature was maintained at 160° F. while agitating the slurry for a 12 hour period. The slurry was then cooled, filtered, and washed to remove sodium sulfate and excess sodium hydroxide. The cake was repulped in water and treated with hydrochloric acid until the pH of about 0.5 was obtained. The slurry was filtered and a depleted barium sulfate cake was obtained weighing 349 lbs. and retaining 0.6 lbs. of europium calculated as europium oxide. The filtrate was treated with hydrogen sulfide to precipitate lead, iron, uranium, and tin (which would be reducible with the europium) as their sulfides and filtered again. It was then concentrated by evaporation. It is used as feed for the reduction step. The analysis of the filtrate was as follows: Volume=750 liters; $Eu_2O_3$ content=5.36 grams per liter.

MATERIAL BALANCE

Feed: $Eu_2O_3$=9.5 lbs.
Depleted $BaSO_4$ cake: $Eu_2O_3$=0.6 lb.
Filtrate: $Eu_2O_3$=8.9 lbs. (balance=100%)
Recovery: 8.9/9.5×100=93.5%

*Reduction Step*

The solution to be reduced had the following analysis: Total oxide=83.9 grams per liter; $Eu_2O_3$=36.5 grams per liter; volume =150 liters. The solution was cycled over a column packed with zinc for a period of 6 hours, at which time the reduction was judged complete. Ammonium sulfate was then added in a slight stoichiometric excess based on the europous ion to precipitate europous sulfate. Separation of the precipitate from the solution was accomplished by filtration.

MATERIAL BALANCE

Feed: $Eu_2O_3$=12 lbs.
Precipitate: $Eu_2O_3$=10 lbs.
Filtrate: $Eu_2O_3$=2 lbs. (balance=100%)
Recovery: 10/12×100=84%

*Final Purification*

Europous sulfate (6 grams, T.O.=66%, $Eu_2O_3$/T.O.=94.7% total $Eu_2O_3$=3.76 grams) was added to a boiling solution containing 5.4 grams of sodium carbonate and 1.6 grams of sodium hydroxide. The slurry was allowed to boil for 10 minutes, after which time it was cooled and filtered, and the precipitate washed free of sulfate ion. The carbonate obtained was dissolved in hydrochloric acid, being careful to exclude all air by blanketing the vessel with nitrogen. After dissolution was complete, a substantial excess of ammonium hydroxide was added and the precipitate separated by filtration in the absence of air. It is preferred to wash the precipitate with dilute ammonia to improve yields. The filtrate was oxidized with air to obtain a precipitate of europic hydroxide. The hydroxide was calcined to yield europium oxide of 99.9% purity.

MATERIAL BALANCE

Feed: $Eu_2O_3$=3.76 grams (purity of europium in feed=94.7%)
Impure fraction: $Eu_2O_3$=0.67 gram
Pure fraction: $Eu_2O_3$=3.13 grams
Balance: 3.80/3.75×100=101%
Recovery: 3.13/3.76×100=83.5%

While specific embodiments of the invention have been described, it is understood that the invention is not limited thereto but covers all the modifications and equivalents within the scope of the appended claims.

I claim:

1. The process of purifying europium in a mixture of soluble tervalent rare earth metal salts in an aqueous solution which comprises subjecting the europium-containing solution, the europium content of which is at least 11% based on total rare earth oxides, to conditions reducing selectively the europium to the divalent state thereby producing an aqueous solution of a mixture of soluble divalent europium ions and soluble tervalent ions of other rare earth metals, converting said rare earth metal salts to sulfates by adding to said solution sulfate ion as a soluble sulfate compound which does not interfere with the separation and purification of europium, said addition of sulfate ion being made under non-oxidizing conditions, thereby to precipitate the europous sulfate crystals and a minor portion of the tervalent rare earth metal salts as impurities and retaining the remainder of the rare earth metal salts in solution as soluble tervalent salts, separating the impure europous sulfate crystals from the mother liquor, converting said europous sulfate to europous carbonate by treating the europous sulfate with a strong alkaline solution of a carbonate, said conversin to europous carbonate being carried out under non-oxidizing conditions to retain the europium in the divalent state, dissolving said europous carbonate in an acid which does not interfere with the separation and purification of europium, said dissolving being carried out under non-oxidizing conditions and so avoiding reoxidation of europium, adding alkali to said europous salt solution to raise the pH to at least about 8 but not greater than about 9.5, thereby precipitating said remainder of the tervalent rare earth impurities as the hydroxides while retaining the divalent purified europium in solution and separating the precipitated tervalent rare earth impurities from the mother liquor.

2. The process described in claim 1 in which the europous sulfate is converted to europous carbonate by reaction with an alkali metal carbonate in the presence of excess alkali metal hydroxide.

3. The process described in claim 2 in which the europous carbonate is dissolved in aqueous hydrochloric acid.

4. The process of claim 2 in which the tervalent rare earth impurities are selectively precipitated as the hydroxides by adding ammonium hydroxide until the pH is at least 8.

5. The process of claim 2 in which the europium content of the europous sulfate crystals is about 90 to 95% by weight $Eu_2O_3$ based on the total rare earth oxide content.

References Cited in the file of this patent

FOREIGN PATENTS 1,209,251    France _____ Mar. 1, 1960

OTHER REFERENCES

McCoy: "Journal of the American Chemical Society," vol. 58, November 1936, pages 2279–2281.

Fernelius (editor): "Inorganic Synthesis," vol. 2, McGraw-Hill Book Company, Inc., New York, 1946, pages 69–73.

Yost et al.: "The Rare-Earth Elements and Their Compounds," John Wiley & Sons., Inc., New York, 1947, pages 65–69.

Sidgwick: "The Chemical Elements and Their Compounds," vol. 1, Oxford Univ. Press, London, 1950, pages 456–457.

Vickery: "Chemistry of the Lanthanons," Academic Press Inc., New York, 1953, pages 131–140.